US010672171B2

(12) United States Patent
Thumm

(10) Patent No.: US 10,672,171 B2
(45) Date of Patent: Jun. 2, 2020

(54) SYSTEM AND METHOD FOR DYNAMIC CONTENT GENERATION IN A VIRTUAL SPACE

(71) Applicant: Alexander Thumm, Prospect (AU)

(72) Inventor: Alexander Thumm, Prospect (AU)

(73) Assignee: LAMPLIGHT FOREST HOLDINGS PTY LTD, Prospect (AU)

(*) Notice: Subject to any disclaimer, the term of this patent is extended or adjusted under 35 U.S.C. 154(b) by 26 days.

(21) Appl. No.: 15/451,464

(22) Filed: Mar. 7, 2017

(65) Prior Publication Data
US 2018/0260993 A1  Sep. 13, 2018

(51) Int. Cl.
G06T 13/40 (2011.01)
A63F 13/57 (2014.01)
A63F 13/42 (2014.01)
A63F 13/54 (2014.01)

(52) U.S. Cl.
CPC .............. *G06T 13/40* (2013.01); *A63F 13/42* (2014.09); *A63F 13/54* (2014.09); *A63F 13/57* (2014.09); *G06T 2200/04* (2013.01)

(58) Field of Classification Search
CPC ..... G06T 13/40; G06T 2200/04; A63F 13/42; A63F 13/57
See application file for complete search history.

(56) References Cited

U.S. PATENT DOCUMENTS

| 2011/0283865 | A1* | 11/2011 | Collins | G06F 3/04817 |
| | | | | 84/464 R |
| 2012/0071240 | A1* | 3/2012 | Koo | A63F 13/52 |
| | | | | 463/35 |
| 2012/0249741 | A1* | 10/2012 | Maciocci | G06F 3/011 |
| | | | | 348/46 |
| 2015/0235434 | A1* | 8/2015 | Miller | G06T 19/006 |
| | | | | 345/633 |
| 2016/0217614 | A1* | 7/2016 | Kraver | G06T 19/006 |
| 2016/0253842 | A1* | 9/2016 | Shapira | G02B 27/017 |
| | | | | 345/633 |

(Continued)

OTHER PUBLICATIONS

"Audio Sources & Listeners—Unity Official Tutorials", YouTube video posted by Unity on Apr. 8, 2013. See p. 1 for date. https://www.youtube.com/watch?v=1BMJFgK68IU (Year: 2013).*

(Continued)

*Primary Examiner* — Chong Wu
(74) *Attorney, Agent, or Firm* — Timothy J. Bechen; Bechen PLLC

(57) ABSTRACT

A computerized system and method provides for the dynamic generation of content in a virtual space. The method and system includes selecting at least one virtual object that provides content in the virtual space and defining interaction parameters for the virtual object, such as movement along an axis in the virtual space. The method and system includes instantiating an avatar, or selecting another object, in the virtual space that moves along the selected axis and pairing a location of the avatar, or the other object to the interaction parameters for the virtual object. Therein, the method and system includes modifying an output generated by the at least virtual object based on changes in position of the avatar, or other object, within the virtual space, the modifying of the output determined based on the interaction parameters.

20 Claims, 10 Drawing Sheets

(56) References Cited

U.S. PATENT DOCUMENTS

| | | | |
|---|---|---|---|
| 2017/0061704 A1* | 3/2017 | Gewicke | G06T 19/006 |
| 2017/0076505 A1* | 3/2017 | Gavriliuc | G06T 19/006 |
| 2017/0091983 A1* | 3/2017 | Sebastian | G10H 1/0008 |
| 2017/0151501 A1* | 6/2017 | Kitamura | A63F 13/54 |
| 2017/0352188 A1* | 12/2017 | Levitt | G06F 1/1626 |
| 2017/0354875 A1* | 12/2017 | Marks | A63F 13/213 |
| 2018/0047093 A1* | 2/2018 | High | G06Q 30/0643 |
| 2018/0096526 A1* | 4/2018 | Valdivia | H04L 51/16 |

OTHER PUBLICATIONS

"Scene view. Center view at object?" posted by Tiles on Feb. 7, 2010. See p. 1. https://forum.unity.com/threads/scene-view-center-view-at-object.40713/ (Year: 2010).*

"AddForce—Unity Official Tutorials", YouTube video posted by Unity on Apr. 8, 2013. See p. 1 for date. https://www.youtube.com/watch?v=MBDWTjn05eg (Year: 2013).*

* cited by examiner

FIG. 8A
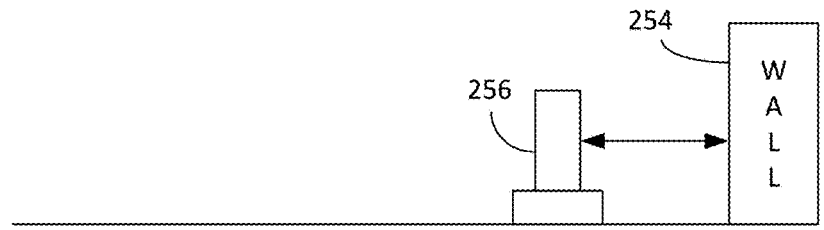
FIG. 8B
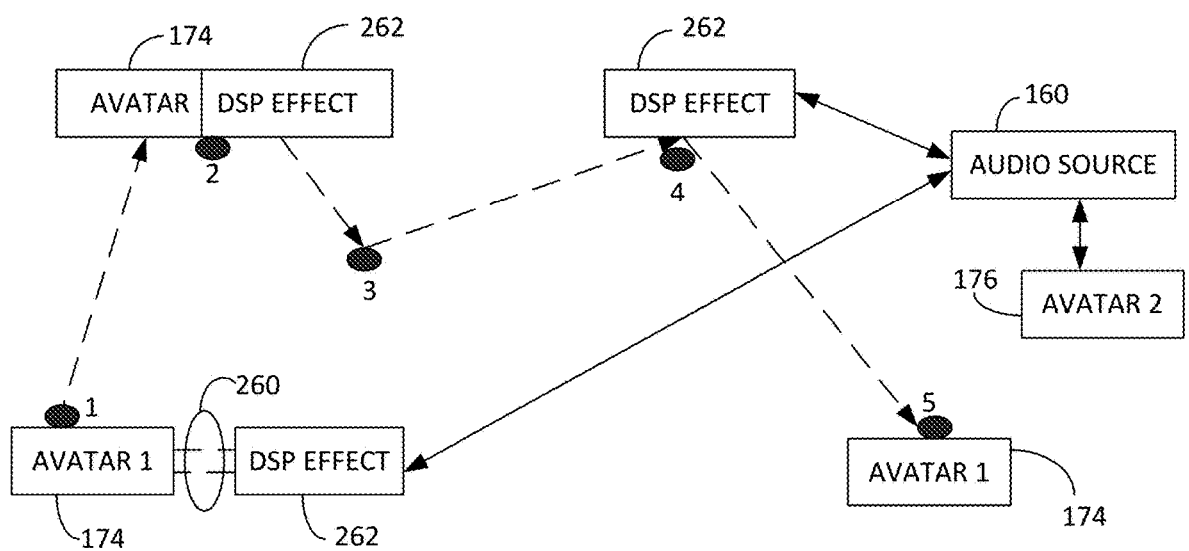
FIG. 9

SYSTEM AND METHOD FOR DYNAMIC CONTENT GENERATION IN A VIRTUAL SPACE

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The disclosed technology relates generally to computer audio and video content generation technology and more specifically to dynamic generation and modification of content in a virtual computing and/or gaming space.

BACKGROUND

Gaming and other electronic interactive environments allow for a wide variety activities between multiple users, as well as interactivity between a single user and the environment. While many gaming or virtual environments allow for entertainment, content generation is an additional benefit.

In current gaming or virtual environments, there is a pronounced limitation in the ability to generate audio and video content. The limitation relates to the environment itself and the ability of the user to control an avatar or otherwise interact with the environment.

Existing techniques for audio and video content generation are based on set, pre-defined parameters and the virtual user having a direct engagement with the content generator. By way of example, one type of content generator may be a virtual musical instrument, the audio content generated when the user virtually touches or otherwise engages the instrument, such as selecting keys of a keyboard. Another musical example may be a predefined set of controller buttons toggled to existing note-playing elements of an instrument, such as selecting the depression of one or more strings on a guitar. In these systems, the content generation is very static and solely controlled by a direct interaction with the user to the instrument itself.

Existing techniques focus on gesture control by the user and/or re-sequencing of pre-composed musical units. These techniques merely seek to emulate real-world musical performances (e.g. seeking expressiveness via emulating the gestures a musician would make if playing an acoustic instrument) or by making sure the musical instrument is always coherent to the context by providing, typically tempo synched, musical fragments that the player has some limited agency in re-arranging through gameplay.

The existing content generation is thus inherently limited by the source content available in the virtual space, e.g. which musical instruments and/or composed musical pieces have been pre-programmed into the space. None of the existing content generation techniques provide for user-generated purely dynamic content. As such, there exists a need for processing operations modifying audio and/or video content in a virtual environment, providing for output generation via one or more output devices.

BRIEF DESCRIPTION

A computerized system and method provides for the dynamic generation of content in a virtual space. The method and system includes instantiating at least one virtual object that provides content in the virtual space and defining one or more interaction parameters for the virtual object, such as movement along an axis in the virtual space. The method and system includes selecting an avatar in the virtual space that moves along the selected axis and pairing a location of the avatar to the interaction parameters for the virtual object. Therein, the method and system includes modifying an output generated by the at least virtual object based on changes in position of the avatar within the virtual space, the modifying of the output determined based on the interaction parameters.

The computerized system and method further includes where the virtual object is an audio source and the interaction parameters are volume, pitch, panning or any other relevant sampling, synthesis or midline related parameter as recognized by one skilled in the art, e.g. ADSR envelope parameters, synthesis AM/FM parameters, etc.). The computerized method and system further includes where the virtual object is a visual source and the interaction parameters may include color assignment, light intensity and radius, the internal parameter sets of various camera filters, such as contrast, brightness, saturation, and any other relevant lighting or visual-filtering parameters as recognized by one skilled in the art.

In the computerized method and system, the virtual environment may include a plurality of avatars, thus the method and system includes receiving one or more switch commands to change a user control from a first avatar to a second avatar, as well as modifying the output generated by the virtual object based on the second avatar. Similarly, the method and system further allows for multiple objects, including switching virtual objects and updating the output based thereon.

In another embodiment, a computerized method for dynamic content generation in a virtual space includes instantiating a first virtual object, the first virtual object providing content in the virtual space, the first virtual object including at least one of: audio content and display content. The method and system includes defining an interaction parameter for the first virtual object, the interaction parameters adjustable to movement along at least one axis in the virtual space;

The method and system includes instantiating a second virtual object and pairing a location of the second virtual object to the interaction parameters for the first virtual object. Therein, the method and system modifies an output generated by the first virtual object based on a proximity relationship between the first virtual object and the second virtual object and providing the modified output to an output device external to the virtual space.

Moreover, one or more of the objects may include the application of physics-simulations applied thereto. For example, if an object is controlled in the virtual space, real world physics can be applied to the object, the physics influencing the relationship between objects. The application of physics also applies to discrete user input commands setting movement of an object in motion, such that the object navigates in the virtual space according to physics-simulation, e.g. rolling and bouncing until momentum is lost.

The method and system, further provides for, in response to a user input command, selecting an avatar in the virtual space, the avatar operative for movement along the at least one axis in the virtual space. The method and system includes receiving user input commands for changing the position of at least one of: the first virtual object and the second virtual object, within the virtual space and modifying an output generated by the first virtual object based on changes in position of the second virtual object.

In a further embodiment, where the user input commands relate to changing the position of the avatar within the virtual space, the avatar changes the position of at least one of: the first virtual object and the second virtual object.

BRIEF DESCRIPTION OF THE DRAWINGS

FIGS. 8a-8b illustrate varying embodiments of control operations of a fader;

FIG. 9 illustrates one embodiment of avatar control and movement within a virtual space;

A better understanding of the disclosed technology will be obtained from the following detailed description of the preferred embodiments taken in conjunction with the drawings and the attached claims.

DETAILED DESCRIPTION

Embodiments of the disclosed technology providing for the dynamic generation of content in a virtual space. The content generation includes audio content and/or video content, whereby the content generation uses a relationship between an avatar and a defined object in the virtual space, or can be based on a relationship between multiple objects in the virtual space.

Figure 1:
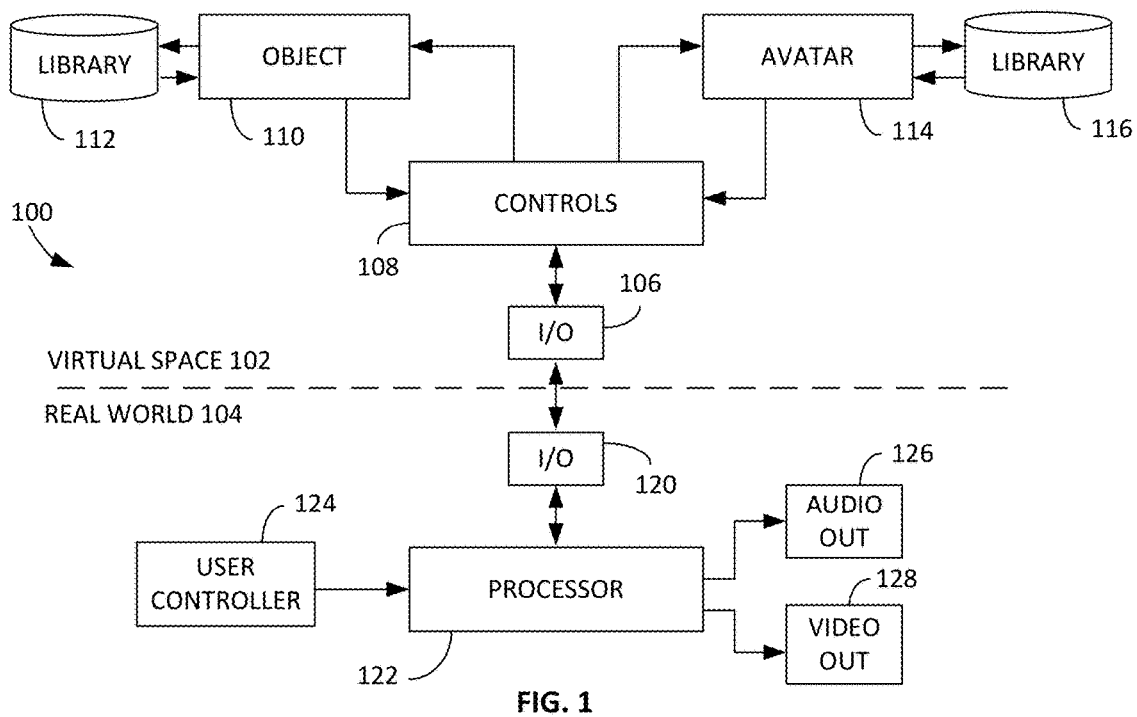
FIG. 1 illustrates a block diagram of a processing environment providing dynamic content generation.

FIG. 1 illustrates a system 100 allowing for dynamic content generation in the virtual space 102 with real world 104 output results. The virtual space 102 includes an input/output interface 106 and control processor 108. The virtual space 102 additionally includes an object 110 with a library 112, as well as an avatar 114 also having a library 116. In the real world environment 104, an input/output interface 120 engages a processor 122, with user controller 124 inputs and audio output 126 and video output 128.

In the system 100, the virtual space is any suitable computer processing environment or gaming space as recognized by one skilled in the art. The system 100 includes additional processing elements not expressly illustrated, but as recognized by those skilled in the art, provide for the generation of the virtual computing space allowing for user engagement, control and interactivity. Such space may be housed in one or more networked computer processing environments with user engagement across a networked connection. One such example of a virtual space may be an online interactive gaming world, as commonly available using current technology means.

The i/o device 106 may be a computer processing module allowing for communication into the virtual space 102. The controls 108 represent a processing module or computer processing device that manages user input control operations, translates and engages the user controls into the virtual space 102. By way of example, the controls 108 allow for controlling an avatar 114.

The object 110 may be any suitable object within the virtual environment. As described in further detail below, the object 110 relates to the generation of content, such as an audio or video content, or effects that modify audio or video content. It is further noted that while the space 102 of FIG. 1 includes a single object 110, any number of objects may be included and the single object 110 is for illustration purposes only.

With the object 110 is a library 112. The library 112 may be one or more storage devices having the objects stored therein. For instance, if the object is an audio file, the library includes the audio content of the file. In another instance, if the object is a microphone input feed, the library includes the programming instructions for receipt of the microphone feed.

The virtual space 102 further includes the avatar 114, along with a library 116 including data relating to the avatar. As used herein, the avatar generally refers to three-dimensional game-character humanoids subject to control functions, e.g. run, walk, jump, etc. It is recognized that the avatar is not expressly restricted to game-character humanoids, but can also represent any suitable object or element in the virtual space where the end user is granted the ability to control or otherwise manipulate. In general, the term avatar as used herein generally refers to any virtual object capable of being controlled by an end user.

Where the virtual space 102 operates within a computing environment, the real world 104 represents physical user interactive devices. The elements may be found within a gaming system, a computing system, self-contained mobile processing device, or any other suitable system used for virtual space interactivity. The i/o device 120, similar to the i/o device 106, allows for interaction between the processor 122 and the virtual space 102, using known i/o interactivity technology.

The processor 122 may be any suitable processing device or devices providing for functionality as described herein. The processing device 122, in one embodiment, includes executable instructions stored in one or more storage device (not expressly illustrated) whereby the processing device performs processing operations in response thereto.

The user controller 124 may be any suitable type of controller, including but not limited to a keyboard, mouse, microphone, touch screen, and/or control pad. The controller 124 receives user input, such input processed and translated by the processor 122 for the virtual space operations 108.

The audio output 126 may be any suitable device operative to provide audio output. By way of example, the audio output may include a speaker, speaker systems, and/or headphones. The video output 128 may be any suitable display device operative to provide the video output generated from the virtual space 102.

In the processing environment 100 of FIG. 1, the method and system provides for dynamic generation of audio and video content via a user engaging the controller 124 with feedback via the output device(s) 126, 128 by operation of an avatar 114 within the virtual space 102. As described in further detail below, the dynamic content is generated by associating the avatar 114 with the object 110, movement of the avatar adjusts the object using interaction parameters associated with the object.

In a further embodiment, the relationship for dynamic content generation is not restricted to the proximity relationship between an object and an avatar. The instantiation of multiple objects allows for the dynamic content generation based on the relationship of objects. For example, where a first object is an audio source, the second object may be a modification of that audio source. The relationship can be defined between the two objects such that the first object output is modified based on the proximity of the second object. Where the object positions/proximity is fixed, the output is then set based on the static proximity value. But it is recognized that objects are moveable within the virtual space, such as one embodiment having an avatar move the object, so the proximity between objects therefore changes and the output is dynamically modified.

Figure 2:
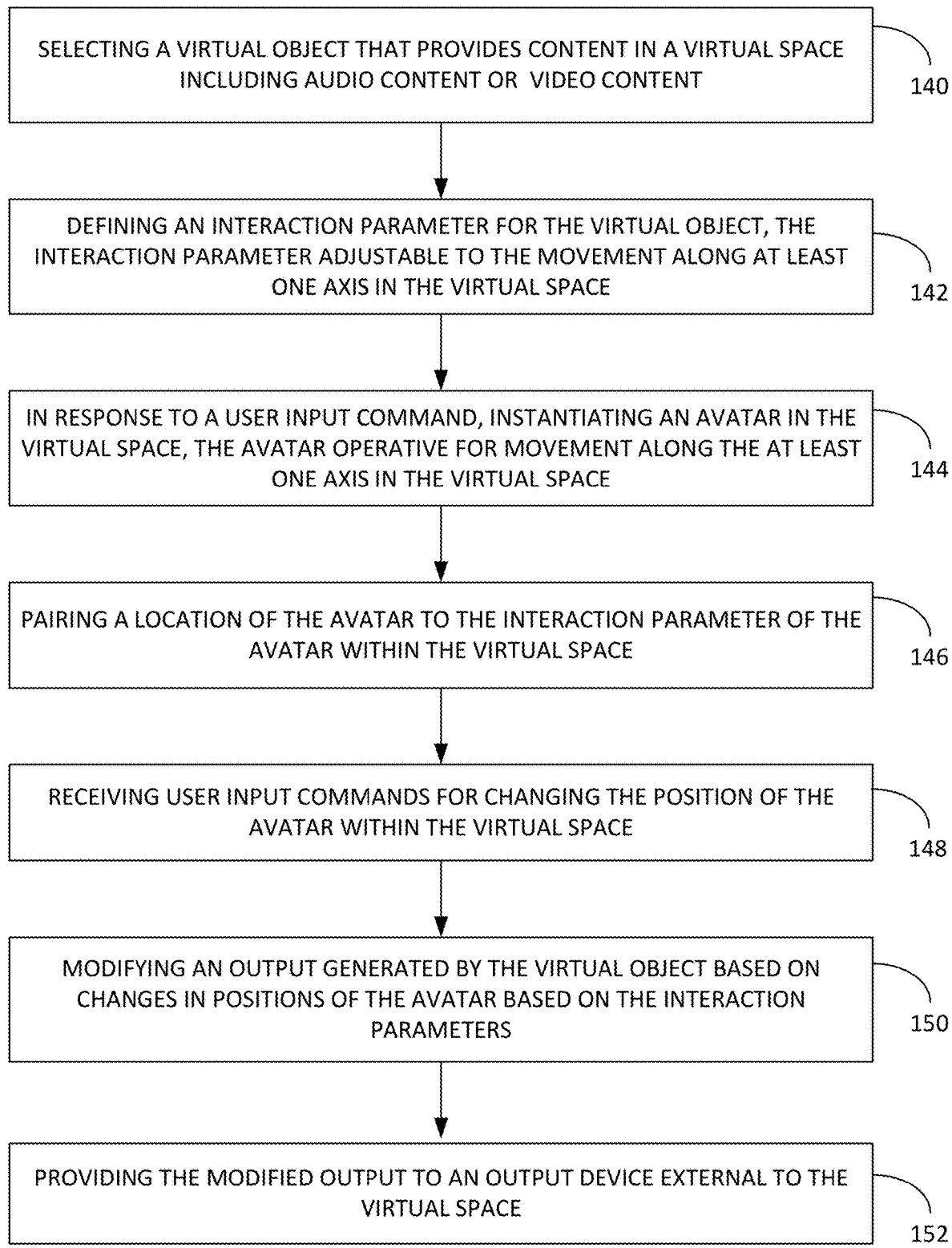
FIG. 2 illustrates a flow chart of the steps of one embodiment of a method for dynamic content generation.

FIG. 2 illustrates a flowchart of the steps of one embodiment of a method for dynamic content generation. The flowchart, in one embodiment, may be performed within the operating system 100 of FIG. 1, including processing steps performed in the virtual space 102, as well as output signal(s) for the audio output 126 and/or video output 128.

In the embodiment of FIG. 1, a first step, step 140, is the selecting of a virtual object, the virtual object providing content in a virtual space. In one embodiment, the virtual object may be an audio content object or a video content object. The content object may include a source, e.g. an audio object may be an audio source. The content object may also include variations or modifications of the content, such as for example audio effects for an audio source.

Sample audio content objects within the virtual space may include, but are not limited to: a sample player playing one or more audio samples; a synthesizer providing audio content, microphone or other audio input line. Sample audio content objects relating to audio effects may include, but are not limited to: digital signal processing (DSP) effects, audio bus and a recording module. The DSP effects may include any suitable effect adjusting the audio content, such as by way of example delay or reverb. The DSP effects include expressive parameters adjustable and made accessible to users for audio manipulation.

Sample video content objects include visual or video sources such as lighting (global or localized lighting), motion and form such as shape emitters or form dynamic modules. Sample video contents objects include visual effects, such as color but not limited to assignment operations or camera filter operations, e.g. contrast, saturation, etc.

Audio/video objects may further include narrative sources providing content within the virtual space. The narrative sources include, for example, objects of verbs, inventory objects and text display. The text display objects may include, for example, synced input and display of text, conversation object (output and navigation), environmental and persistent text.

Audio/video objects may further include narrative inputs providing content within the virtual space. The objects may include verb-object interaction response authoring, conversation object authoring and navigation, synced input and display of text, and hyperlink navigation.

The objects may further include and/or relate to control parameters for operations in the virtual space. The control parameters may be further grouped based on player interaction parameters and automated controls. Player interactions may include control in the virtual space via the avatars, control via external hardware and control via internal hardware.

The classes of player interactions are further delineated relative to the virtual space operations, including for example objects relating to game-area navigation, camera view, cursor movement, avatar control/selection.

The above listing of objects represents sample classes and general classifications, and is not an exclusive or comprehensive list. Further objects, as recognized by one skilled in the art, are within the scope of the presently described virtual object, where the virtual object relates to interactivity in the virtual space.

In the flowchart of FIG. 2, a next step, step 142, is defining an interaction parameter for the virtual object, the interaction parameter being adjustable to movement along at least one axis in the virtual space. The interaction parameters are relative to the object itself. By way of example, if the object is a lighting effect, the interaction parameter may be adjusting the brightness of the lighting effect. In another example, if the object is an audio sample, the interaction parameter may be an adjustment of the audio sample using the basic example of volume. Where the interaction parameter is tied to an axis, the example of volume may be movement up the axis increases volume and movement down the axis decreases volume.

In the virtual space, step 144 is instantiating an avatar, the avatar operative for movement along the at least one axis in the virtual space. The instantiating of an avatar may be performed using any number of suitable techniques as known in the art. For example, one technique may be being within proximity of an avatar and selecting one or more designated buttons. In another example, one technique may be a designated avatar switching button allowing a user to jump from one avatar to another. In another example, an interface allows for a user to actively select from one or more available avatars and thus place the avatars into the virtual space. Regardless of the specific selection technique, the selection operation itself ties the user input controls to the selected avatar, allowing the user to move the avatar in the virtual space.

Based on the virtual environment, if it is a two-dimensional space or a three dimensional space, the corresponding number of axis are available for movement. For example, in a three dimensional, movement is available along an x-axis, a y-axis and a z-axis.

In the flow diagram of FIG. 2, step 146 is pairing the location of the avatar to the interaction parameter(s) for the virtual object. The pairing operation ties the movement of the selected avatar for the corresponding object, where the movement thus allows for changing an output of the virtual object.

Step 148 is receiving user input commands for changing the position of the avatar within the virtual space. Step 148 may be performed using known game engine or virtual space engine technology for navigating the user in the virtual space.

Step 150 is modifying an output generated by the virtual object based on changes in position of the avatar based on the interaction parameters. As noted in FIG. 1, where the user input via the user controls 124 operates in the virtual space 102, the output of the virtual space interaction is made available to the video output 128 and audio output 126. Thus, as the avatar is tied to the virtual object with interaction parameters defined by the avatar movement, the output generated by the virtual object is modified relative to the changes in the avatar positions. For example, if the virtual object is an audio clip and the interaction parameter is the frequency of the audio clip, movement in the selected axis by the avatar changes the frequency. Continuing in this example, if the axis is an x-axis movement, the frequency may be increased as the avatar moves up the x-axis and decreased as the avatar moves down the x-axis. In general, the movement along one or more axis is based on proximity between the avatar and the object (or multiple objects), so the movement along the one or more axis changes the proximity values and thus provides for modification of the output.

In the methodology of FIG. 1, the final step is step 152, providing the modified output to an output device external to the virtual space. In the sample embodiment of FIG. 1, this may include the audio output 126 and/or video output 128. Using the above example of adjusting the frequency of an audio sample, the modified output is thus provided to the audio output 126, with the avatar movement itself visible via the video output 128.

Where the methodology of FIG. 2 provides for a single avatar and a single virtual object, the present method and system additionally operates in a larger virtual space having further functionality with any number of virtual objects and any number of avatars.

Figure 3:
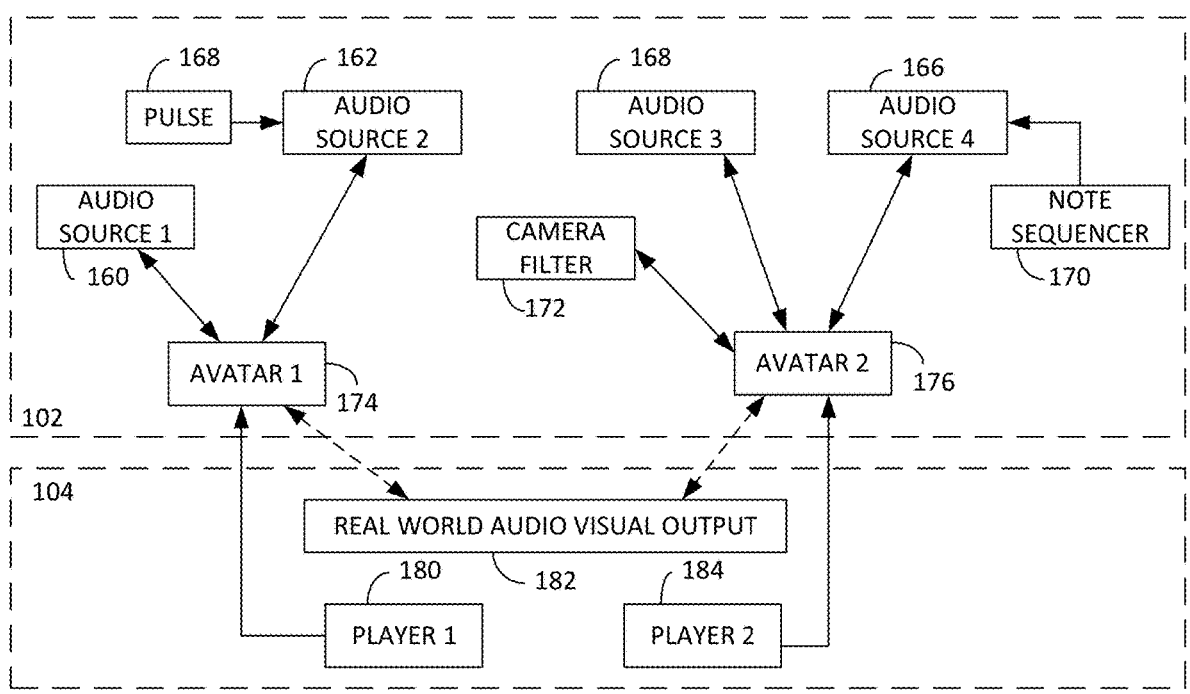
FIG. 3 illustrates a single-player processing environment providing dynamic content generation.

FIG. 3 illustrates an embodiment having a virtual space 102 with six exemplary audio and video objects and a plurality of avatars. The virtual space includes a first audio source 160, second audio source 162, third audio source 164 and fourth audio source 166. Further in this virtual space are additional objects complimentary to the audio sources, here having examples of a pulse engine 168 and a note sequencer 170. For example, the pulse engine 168 is engaged to the audio source 162 such that the audio source 162 may be a pulse triggered audio sample. For example, the note sequencer 170 is engaged to the audio source 166, where audio source 166 may be a synthesizer or other music-generation source.

The virtual space 102 further includes a visual object 172, here a camera filter for adjusting one or more camera filtering values. The virtual space includes a first avatar 174 and second avatar 176.

In the user space 104, a first player 180 operates controls with virtual world outputs provided to the output device 182, as well as a second player 184. In the system of FIG. 3, it is recognized that numerous processing elements are omitted for clarity purposes only, but one skilled in the art recognizes the operational functionality of player 180 engaging the virtual world via any suitable computing means. The output device 182 includes processing operations for receiving the output signals from the virtual space 102 and generating the output, including for example a video display or screen and speakers.

FIG. 3 provides for illustrating the framework for dynamic virtual space setup with common object connections. As described in further detail below, the objects 160-172 in the virtual space 102 can be created, destroyed, moved and routed to other objects or players.

As illustrated, the connecting arrows between the avatars 174 and 176 and the objects 160-172 illustrate proximity relationships in the virtual space, wherein the player 180 and/or player 184 can manually create the connections, as well as control movements in the virtual space. The objects can be instantiated by the player 180 during gameplay. Moreover, the dynamic manner of the virtual space allows for the player 180 to change engagement of avatars, such as switching from avatar 174 to avatar 176, if the second player 184 is not actively engaged. Here, the avatars themselves are engaged with the objects, so changing avatars can change the object engagement.

Using the methodology of FIG. 2, in the exemplary embodiment of FIG. 3, as the player 180 operates the avatar 174 in the virtual space 102, the movement of the avatar 174 modifies the virtual objects 160, 162. In this embodiment, the audio and visual information received by the avatar 174 is combined at the audio visual output device 182.

Further variations and embodiments can operate within the general context of FIG. 3, including single and multi-player engagement in the virtual space. Embodiments include local multiplayer as well as distance multiplayer embodiments.

Single player games or virtual environments include at least one avatar. The avatar movement is constrained in the virtual space by a basic physics simulation that determines gravity, smooth movement thorough the dimensional environment and object collisions.

Avatar control is an integral part of the virtual environment. A current active avatar (CAA) represents the current avatar controlled by the player, such as the avatar 174 controlled by player 180. In the virtual environment, players can create new avatars at any time, as well as destroy avatars. One setting provides that when a new avatar is created, that avatar becomes the CAA. Additionally, with multiple avatars, the player may manually select the change of the designated CAA.

In the example of multiplayer, FIG. 3 includes the second player 184, engaging avatar 176. In a local multiplayer, players 180 and 184 share the output 182. In local multi-player, controls operate similar to the single player embodiment, but further including rules precluding a player switch to control an avatar already being controlled by the other player. Similarly, one player may lock an avatar, thus when the avatar is not being controlled, other players are prevented from engaging the avatar.

Another embodiment is a remote multiplayer environment having multiple avatars. Using again FIG. 3, the difference being player 180 and player 184 are geographically separate and would have individual audio visual output elements. Therein, the players 180 and 184 do not share the output 182 of FIG. 3, but would each have their own output device.

Moreover, it is noted that the multiplayer environment is illustrated with two players, but the present method and system operates using any number of multiplayers. For example, in a large virtual space, there can be tens or even hundreds of multiplayers, therefore the present method and system provides general interactive guidelines applicable to varying scales of virtual environments and is not expressly limited to single or double player environments.

When an avatar is assigned or matched to an audio source, the audio source can be in either a locked or unlocked mode. In a locked-listener mode, the audio object may start in an off position as the default position. When the avatar is then locked to the source, the player may then engage and start the audio source. In another embodiment, a player may select an audio source on, the turning on may then activate the locking of the avatar and source. Either way, once the source and avatar are locked, the position of the avatar relative to the audio source determines one or more output parameters, such as by way of example volume and panning.

In one embodiment, the audio source may then be turned off, but the connection with the avatar remains connected. Various other embodiments provide for toggling between avatars and objects, as described in further detail below regarding multiplayer and multi-avatar environments. At any time, the player can manually replace the current listener, regardless of whether the audio source is playing or stopped. If playing, this does not interrupt audio playback as it smoothly interpolates from previous to new listener position and orientates the output modifications.

In one embodiment, the listener and audio source do not need to be locked. In an unlocked-listener mode, the audio source can always be dynamically re-assigned to the current active avatar in the virtual space. Thus, if the player switches avatars, the connection from the audio source is updated automatically to the selected new current active avatar.

Where there are multiple avatars and multiple sources, any single avatar can be the simultaneous listener of any number of audio sources. Using the exemplary FIG. 3, the virtual space 102 includes 4 audio sources 160, 162, 164 and 166 with avatars 174 and 176. The dashed lines from the avatars 174 and 176 to the output 182 represent audio signals.

With multiple audio sources, the player can hear a mix of the connected or locked audio sources. Thus, in the FIG. 3 embodiment, if the player 180 engages avatar 174, the output 182 includes audio sources 160 and 162, where the output of the sources 160 and 162 are adjusted position of the avatar to the source. Similarly, if the player switches to the second avatar 176, the output 182 then switches to provide audio outputs 164 and 166. The above presumes that the audio sources 160, 162, 164 and/or 166 are turned on and active, as it is understood that if an audio source is turned off or otherwise inactive, no output is generated.

Figure 4:
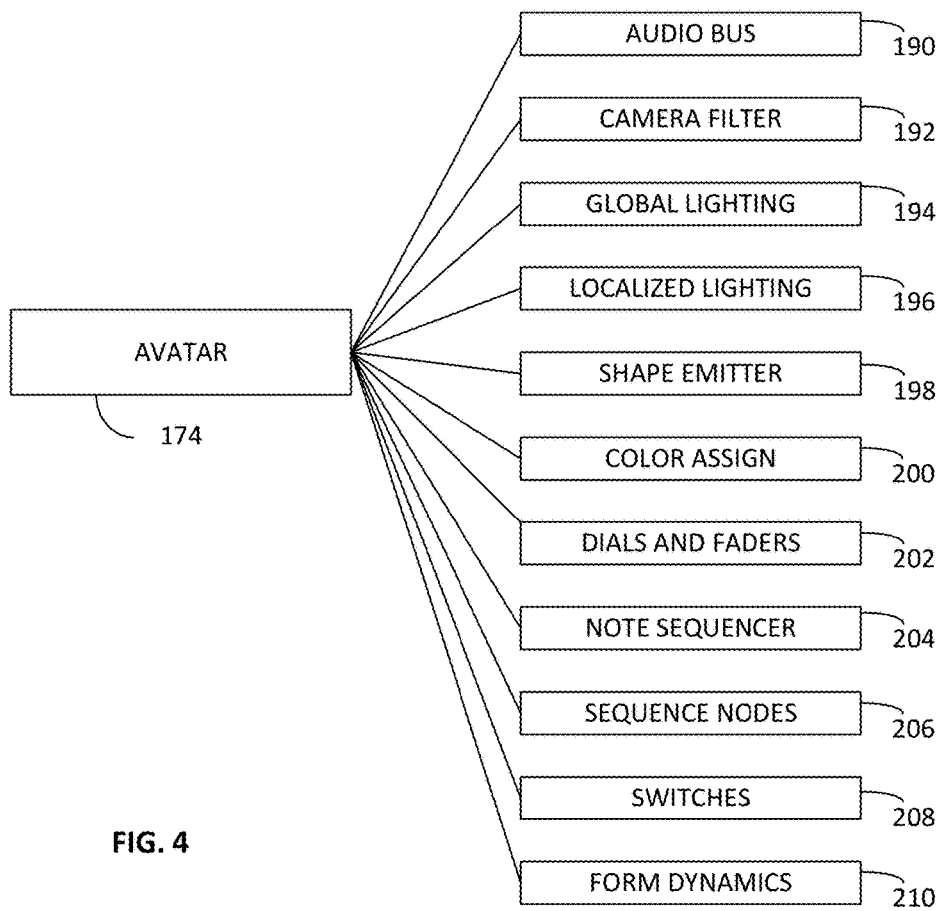
FIG. 4 illustrates a graphical representation of a plurality of virtual objects being able to be controlled by the virtual element.

The virtual objects additionally include non-audio sources. FIG. 3 illustrates one example of a video object, a camera filter 172 providing video output adjustment for the second avatar 176 (as it is locked to avatar 176). FIG. 4 illustrates a sample of available objects. These exemplary objects affect audio and/or video output based on the assigned interaction parameters relative to the proximity or axis-defined distance between the avatar and the object.

FIG. 4 does not provide an exhaustive or exclusive list, but rather a representative listing of available objects, where further objects may be objects as recognized by one skilled in the art. The proximity of an avatar to a connected audio bus 190 controls volume of the audio, as well as panning via the avatar's rotation. The proximity of an avatar to a connected a camera filter 192 controls the amount of filter applied, e.g. wet/dry, to a scene's main camera, or can control specific parameters of individual camera filters. The proximity of an avatar to a connected global lighting object 194 controls the amount of light-settings applied to an associated object. Since any scene will have its own default light-setting, this connection performs a continuous linear interpolation between the object's setting and the default light settings of the scene. The proximity of an avatar or object to a localized light object 196 controls the intensity and/or radius of a light source.

A shape emitter 198 has no default state, but can be used to control a wide variety of object emission parameters based on proximity. The proximity of an avatar or object to a color assign object 200 controls the amount of color to apply to any object it is coloring. This connection performs continuous linear interpolation between the object's output color and the default color of any connected objects. Dials and faders 202 adjust the output value of the dial/fader based on avatar or object proximity. This applies to standalone dials/faders as well as to those that are attached to most kinds of dynamic objects. Thus, the value generated by the dial/fader influences any associated parameters.

The proximity of an avatar to a note sequencer object 204 determines the note sequencer's volume, where even though the note sequencer does not directly output audio, the user can control the master volume level of the notes that it sends to an audio source. The proximity of an avatar to sequence nodes 206 controls the volume of any sound triggered in a sequence based on the listener distance to a first node in a sequence. The proximity of an avatar to switches 208 controls a binary on or off determination based on proximity of the avatar. Form dynamics 210 have no default state, but the proximity to an avatar can be used to control the speed and/or range of various motions: rotation, scaling, position-oscillation and orbit by way of example.

As noted above, the position of the avatar relative to the object defines output modification. Proximity allows for position determination relative to the object. As noted, proximity can be from an avatar, but further embodiments also provide for dynamic output generation controlled by proximity between multiple objects.

Figure 5A:
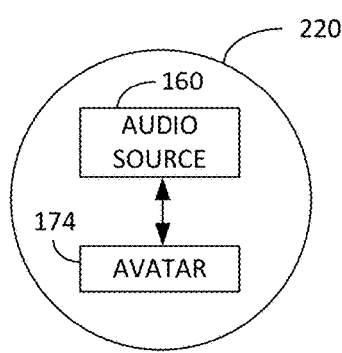
FIGS. 5a-5c illustrate varying embodiments of proximity regions for object interaction.
Figure 5B:
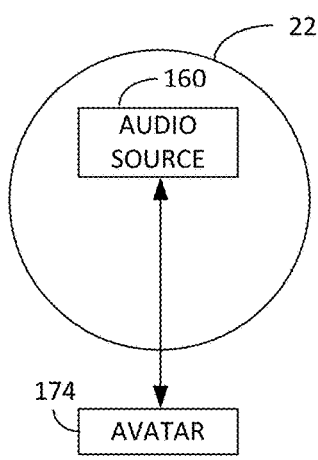
Figure 5C:
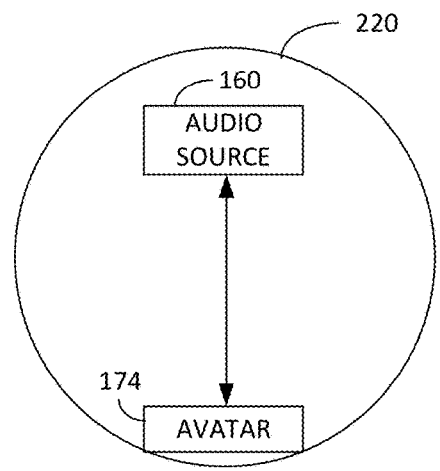

FIGS. 5A-5C provide illustrated examples of proximity field 220 between the avatar 174 and an audio source 160. In this example, the proximity field being circular, the radius of the field determines the effective range and intensity of the parameters of the object. The proximity fields are centered on the object itself, such that if and when an object is moved within the virtual space, the proximity field also moves.

Stated in different terms, the proximity determines a value applied to modification of the object. In the example of an audio bus associated with an audio source, the proximity determines the volume level of the output to the avatar. For example, using the audio source 160, the proximity field 220 around the audio source 160 determines the radius within which the sound is audible. The sound is loudest when the avatar is at the center.

In FIG. 5A, the avatar 174 is about half way between the center and the outer edge of the field 220, thus the volume of the audio source 160 should be about half volume. By contrast, FIG. 5B, the avatar 174 is outside the proximity field 220 and thus the audio source 160 is inaudible to the avatar 174. Part of player control, the player may modify the field size. FIG. 5C illustrates the same proximity of avatar 174 to audio source 160 as FIG. 5B, but an increase in the size of the field 220. Thus, the audio source 160 is now audible to the avatar 174.

While illustrated in FIGS. 5A-5C with audio source, the object may apply to video sources. In one example, the object may be a localized light object, where the light is at full intensity when the avatar is next to the object and the light is not visible, e.g. intensity set to zero, when the avatar is outside the proximity field. In the above example of switches, the proximity field does not determine a range, but rather if the avatar is within the proximity field, the switch can be on and once outside the field the switch is off (or vice versa).

Where many objects use the proximity field and radius as a means to adjust intensity of one or more output parameters, one exception is digital signal processing (DSP) effects. With DSP effects, the audio source itself acts as the listener, unlike other objects where the avatar is the listener. The radius of a proximity field determines the effective range and intensity of the effect for any connected audio source within its radius. Similar to the FIG. 5 proximity field, the effect of the DSP effect is greatest when the audio source is at the center of the proximity field, and inaudible when outside the field.

Figure 6:
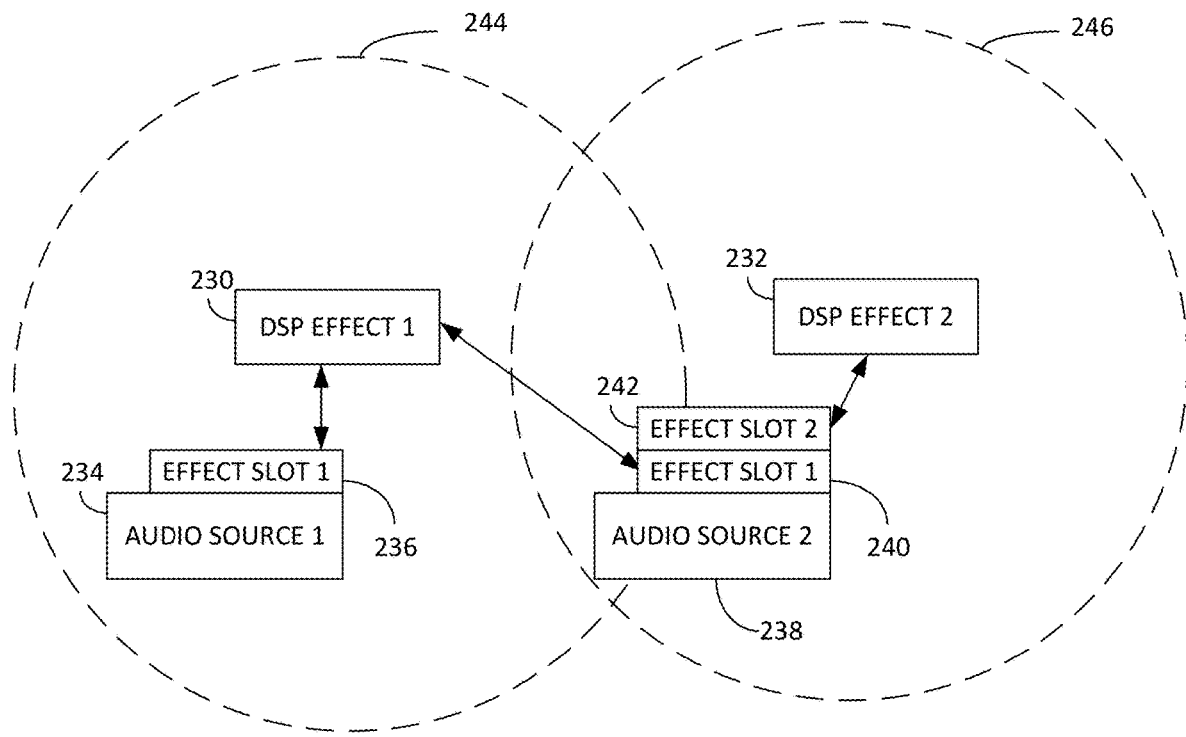
FIG. 6 illustrates proximity regions with multiple audio sources and objects.

FIG. 6 illustrates a system having multiple DSP effects, a first DSP effect 230 and a second DSP effect 232. A first audio source 234 includes a first effect slot 236, and a second audio source 238 includes a first effect slot 240 and second effect slot 242. Additionally, each DSP effect includes proximity fields 244 and 246, respectively.

As shown in FIG. 6, DSP effects can be connected to multiple audio sources at once. Each audio source can have a different ordering of effects, players can re-order these effects at any time. In FIG. 6, first audio source 234 has the first DSP effect 230 in its chain, the second audio source 238 has the first DSP effect 230 in its chain, processed before the second DSP effect 232. Therefore, as the audio sources 234, 238 are moved within the virtual space, the proximity to the DSP effects 230 and 232 change, changing the effectiveness and intensity of the effect for the audio source. Whereas, it is further noted that for output generation to the player, not illustrated in FIG. 6, the relationship of the audio source to the avatar thus further defines the audio output.

Dials and faders are another example of audio or video effects that are not solely determined by avatar to object proximity. Dials and faders can be assigned to measure their proximity to any scenery object, as well as to an avatar proximity.

Figure 7A:
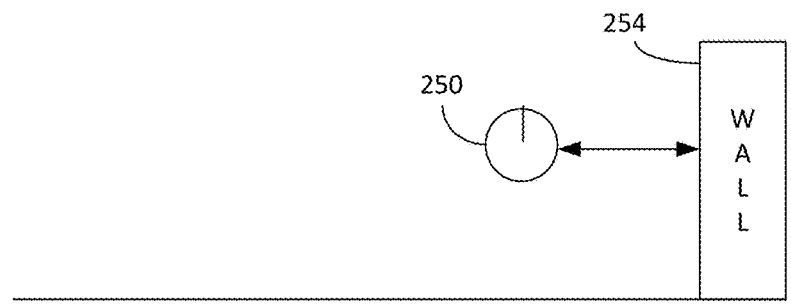
FIGS. 7a-7b illustrate varying embodiments of control operations of a dial.
Figure 7B:
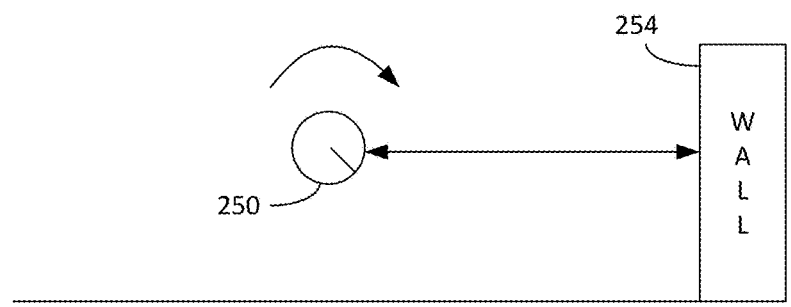

FIGS. 7A-7B illustrate an example of a fader 250 set in proximity to the virtual world scenery object of a wall 254. In this case, the wall 254 is an inanimate object thus not subject to movement. FIG. 7A illustrates a sample starting position with a given proximity, with FIG. 7B illustrating movement of the dial 250 away from the wall 254. In virtual gameplay, the player may control the dial 250 either directly, via an avatar or other means. As the dial 250 is moved away from the wall 254 (FIG. 7B), the dial's value is dynamically increased in proportion to the distance away from the wall 254. Relative to the output received by the player, in the virtual space the dial is connected to an audio source and the effect of the dial therein has a change in the output of the audio source.

FIGS. 8A-8B illustrate the similar relationship but with a fader 256 being adjusted based on a proximity to the wall 254. As the fader is moved back from its position in FIG. 8A to its position in FIG. 8B, the value of the fader 256 is thus dynamically increased in proportion to its distance to the object. Similar to the dial 250 of FIGS. 7A-7B, the fader 256 may be controlled by the player operating in the virtual space.

In addition to the defined proximity of an object to an avatar for output generation, the present method and system further facilitates the movement of objects within the virtual space. For example, an avatar is able to pick up and carry objects in the virtual space. FIG. 9 illustrates an example of the avatar 174 picking up (260) the DSP effect 262. The DSP effect 262 is coupled to the audio source 160 such that the DSP effect 262 modifies the audio source 160 output based on the designated DSP effect, the intensity of the modification based on the proximity of the DSP effect 262 to the audio source 260.

In the FIG. 9 illustration, the avatar 174 holding the DSP effect 262 thus moves in the virtual space, the movement of the avatar 174 illustrated by the dashed arrows. Proximate to the audio source 160, the avatar 174 is moving closer to the audio source 160, which thereby increases the effect level on the audio source.

In the exemplary movement, the avatar 174 cross-crosses across the virtual space, illustrated by points 1-5. The DSP effect 262 is picked up at point 1, moved through space to points 2, 3 and 4. In this exemplary embodiment, the avatar 174 drops the DSP effect at point 4, continuing its movement to point 5.

In this embodiment, the second avatar 176 is an active listener, hearing the audio source 160 modified by the DSP effect 262. The DSP effect modification increasing in intensity by the avatar movements at points 1, 2, 3 and 4, remaining constant when the avatar moves from points 4 to 5.

Varying embodiments can include, for example, a second player controlling the audio source 160, so movement of the audio source 160 further effects modification of the DSP effect 262. Whereby, the DSP effect 262 is a virtual object that can be picked up and moved in the virtual space. Similarly, the audio source is also a virtual object capable of being moved in the virtual space. As the dynamic content generation is based on the proximity between objects and/or proximity with avatars, the generated output is therein modified based on the movement in the virtual space.

In addition to avatar-based movement of objects, the virtual space further applies defined physical constraints on motion. Physics-based parameters controls rely on a special relationship between two objects, such as an anchor and motion. The anchor and motion is a single object type consisting of two interdependent parts. The object-type is a physics-based parameter.

Figure 10A:
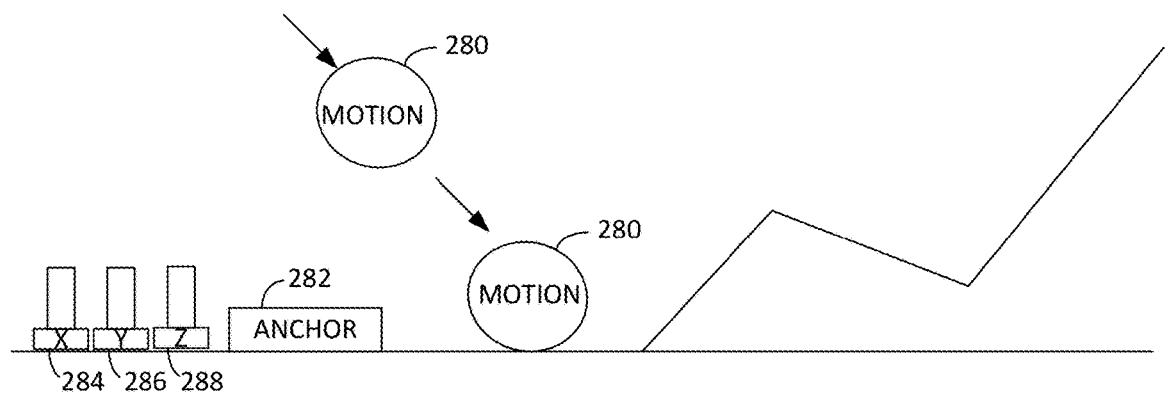
FIGS. 10a-10c illustrate varying embodiments of object motion within the virtual space.
Figure 10B:
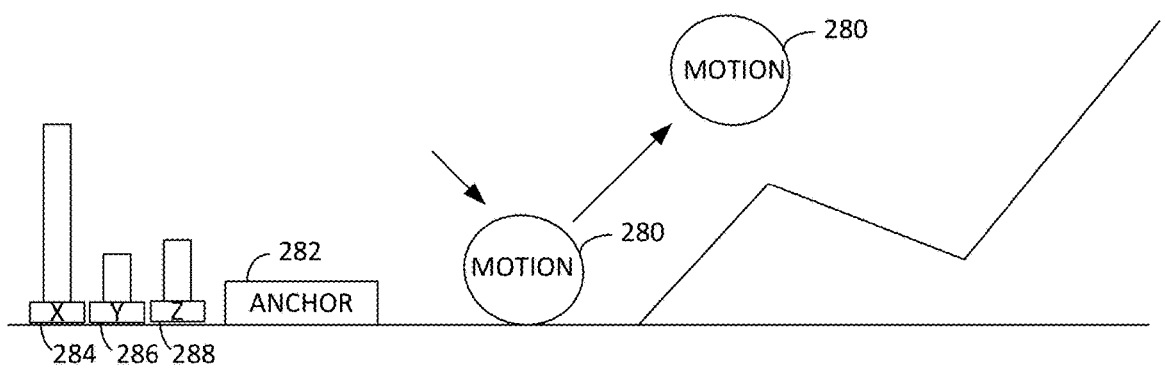
Figure 10C:
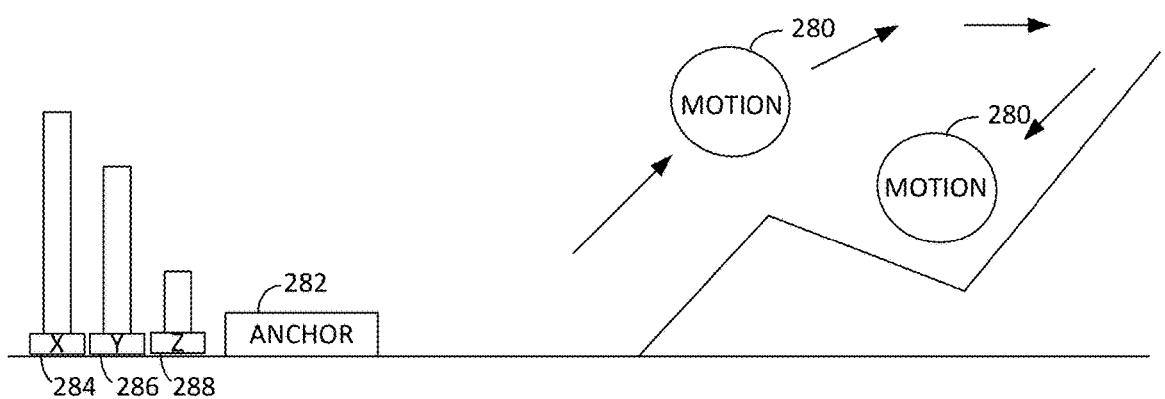

FIGS. 10A-10C illustrate an example of object movement. The virtual space includes motion 280 and anchor 282. The motion 280 is further noted by fader representing axis-specific movement, here faders 284, 286 and 288 for the x, y and z axis respectively.

The anchor 282 is set in place in position where the player creates it. The anchor 282 may additionally be moved like other objects, including picked up by an avatar and being carried around. The player may use an anchor 282 freeze the motion 280 object at any time, or to magnetize it, i.e. draw the motion 280 towards the anchor 282. The motion 280 component has a full gravity simulation. The player can dynamically control its physical parameters, such as bounciness and angular and linear drag. The player can dynamically apply forces, such as via an avatar or cursor, to propel the object through 3D virtual space, e.g. throwing, rolling, dropping, etc.

The illustration of FIGS. 10A-10C provide for motion 280 within the virtual space relative to the anchor 282. In that motion, the faders 284, 286 and 288 automatically adjust. Thus in FIG. 10A, the motion 280 is applied, such as by an avatar or a cursor, causing the motion to drop at an angle.

FIG. 10B illustrates the motion 280 bouncing off the floor of the virtual space and climbing up in height. As visible in the faders 284, 286 and 288, the x-axis has increased as the motion 280 moves away from the anchor 282, the y-axis only changes slight because the motion 280 is in about the same position as the starting position of FIG. 10A, and the z-axis does not appear to change. In this example, it is noted that the image is essentially a two-dimensional representation so the z-axis does not change, but one skilled in the art recognized that in a three-dimensional virtual space, the z-axis may be similarly affected by the motion 280.

FIG. 10C further shows motion 280 bouncing off the terrain and gravity pushing the motion 280 into the lower area. Relative to the anchor 282, the faders further adjust, the x-axis fader 284 further increasing, the y-axis fader 286 increasing and the z-axis 288 remaining unchanged.

For example, each of these parameters of the faders 284, 286 and 288 can be assigned to other output parameters. For example, x-axis fader 284 can be assigned to the volume of an audio source, the y-axis fader 286 can be assigned to control the intensity of a light source and z-axis fader 288 can be assigned the a filter frequency of a DSP effect. Thus, the example of motion 280 and anchor 282 dynamically modifies output effects using the physics of motion applied in the virtual space.

In the virtual space, the processing operations may include any suitable means for connecting an avatar to an object or allowing for object to object connection (e.g. connecting a DSP effect to an audio source). One such technique may be avatar selection of the object. Another technique may be for the user to use a cursor and draw a line to connect objects. Similar to connection, disconnection may be by any suitable means. In one embodiment, when an object is connected, the processing operations automatically generate a disconnect button allowing user selection.

Where the above examples include audio objects, the present method and system applies to video objects. For example, the virtual space may include an in-game main camera. The camera may include filter slots allowing for camera filter operations. The avatar may select the camera filter, which is then applied to the main camera. Based on proximity of the avatar to the filter, the in-game camera is then modified accordingly.

By using the various objects, associating the objects with other objects or avatars, and using the proximity of the avatar to a specific object, the system dynamically generates output modified by the objects.

Further interactions with multiple objects provides for further varying of user generated content. The above embodiments describe a general architecture, but further refinements and coupling of objects and interaction parameters can provide for a limitless number of variations of content generation.

For example, one embodiment may include controlling parameters with other parameters, such as controlling one or a group of faders with a single fader. In this example, if there are multiple faders, each fader tied to a different audio or video source, a player can control multiple faders with a single fader control. Another example may be inclusion of a scaling factor between controlled faders, such as a dial is used to set a scaling factor. Using the example of a 1.5 times scaling factor, if a first fader is adjusted, the linked fader can then be automatically adjusted by a factor of 1.5 times.

A sequence of multiple faders may be paired, scaled, mirrored and otherwise interconnected for branching and scaling interactions. For example, a second, third and fourth fader are mapped to a first fader. The fourth fader is scaling up the incoming value from the first fader. Fifth and sixth faders are mapped to the fourth fader, taking on the fourth fader value after scaling of the first fader occurs. In this example, the player moves the first fader and the second through sixth faders then automatically adjust.

Another variation is node based pattern sequencing. Node based sequencing allows players to create linear or branching pulse-controlled sequences of nodes. In one embodiment, the player can create a node anywhere in the virtual world. A minimum of two nodes are needed to make a sequence. A pulse object drives the sequence, such as being connected to a start node of the node series. For example, the pulse object can be a toggle on/off, with its tempo determines the tempo of the sequence. As the pulse object uses default parameters, the player could, for example, use the avatar proximity to dynamically adjust the tempo.

A further embodiment provides for area control points within the virtual space. Multiple discrete play areas can be defined in the virtual space, where the play areas are visually separate from each other. In the virtual space, the user cannot see from one area to another, but audio can carry between the spaces. For example, while in the virtual space, the user hears the aggregate of what all the avatars are hearing at any given moment.

Within these defined areas, each area can have a control-point, to which an avatar can be attached using the proximity relationship described herein. Therefore, the avatar's proximity to an area's control-point will effect the levels of all compatible objects within the area. For example, compatible objects may include volume, panning, wet/dry levels of audio effects, wet/dry levels of camera effects, intensity of lighting, and other objects, controlled by the proximity relationship.

In one embodiment, any modifications are applied area-wide second to any local modifications various objects may be undergoing. For example, if an audio source in an area has a volume dial at halfway, then the area control-point will modify that already-reduced volume based on changes in proximity. For example, if another audio source is at full volume, then the area control-point will apply the same modification factor based on the avatar's proximity to the control point. Stated in other terms, the relative differences between volumes or other object outputs modifications, of the effected objects within the area will remain the same, as a global (area wide) modification is applied to all of the objects.

In a further embodiment, specially designated aggregate areas can contain duplicates of the control points for all other given areas in a discrete space. Thus, in the aggregate area, one or more avatars can be in a proximity relationship to the multiple control points contain within, providing meta-mixing of output levels of all other areas.

A further embodiment of the method and system provides for automated cyclical motions providing for dynamic content generation. For example, one embodiment may include a spinning platform within the virtual space. In the virtual space, the user may adjust the spin-speed and the physical radius of the platform. Any kind of object can be placed on the platform, rotating with the platform. The rotation of the object on the platform changes the object's position in relation to other objects, including for example its rotation about the Y-axis.

For example, in one embodiment if an avatar stands on an outer edge of the platform, listening to an audio source not on the platform, the spinning platform changes the proximity relationship. This change in proximity would change the volume of the audio source as the avatar travels away from the object, and then as the avatar circles around and travels toward the object. In this embodiment, the panning of the audio source is also adjusted as the avatar's relative rotation changed as it span.

A platform can also have other movements. For example, another embodiment may include a position-oscillating platform, which relates to other objects but can continually oscillate its position up/down or side-to-side at a user-controlled speed. Another embodiment may include an orbit, where an object can be directed to orbit around another object at a user-controlled speed and relative distance. The parameters can be mapped to the orbiting object's dynamic position, thereby effecting dynamic content generation based on the proximity changes from the orbital movement.

A further embodiment is anchoring the motion of one object to another. Any object type can be connected directly to a motion object and made to follow its absolute position in virtual space. For example, movements of avatars (and objects) as illustrated in FIGS. 9 and 10 can include anchoring. For example, movement of the object 262 in FIG. 9 could include having another object anchored thereto, such that the virtual space movement of the object 262 also mirrored by an attached object. This can also be seen in the movement of FIGS. 10A-10C with motion of the object 280.

Figure 11:
FIGS. 11-17 are exemplary screenshots of gameplay using the dynamic content generation technique.
Figure 12:
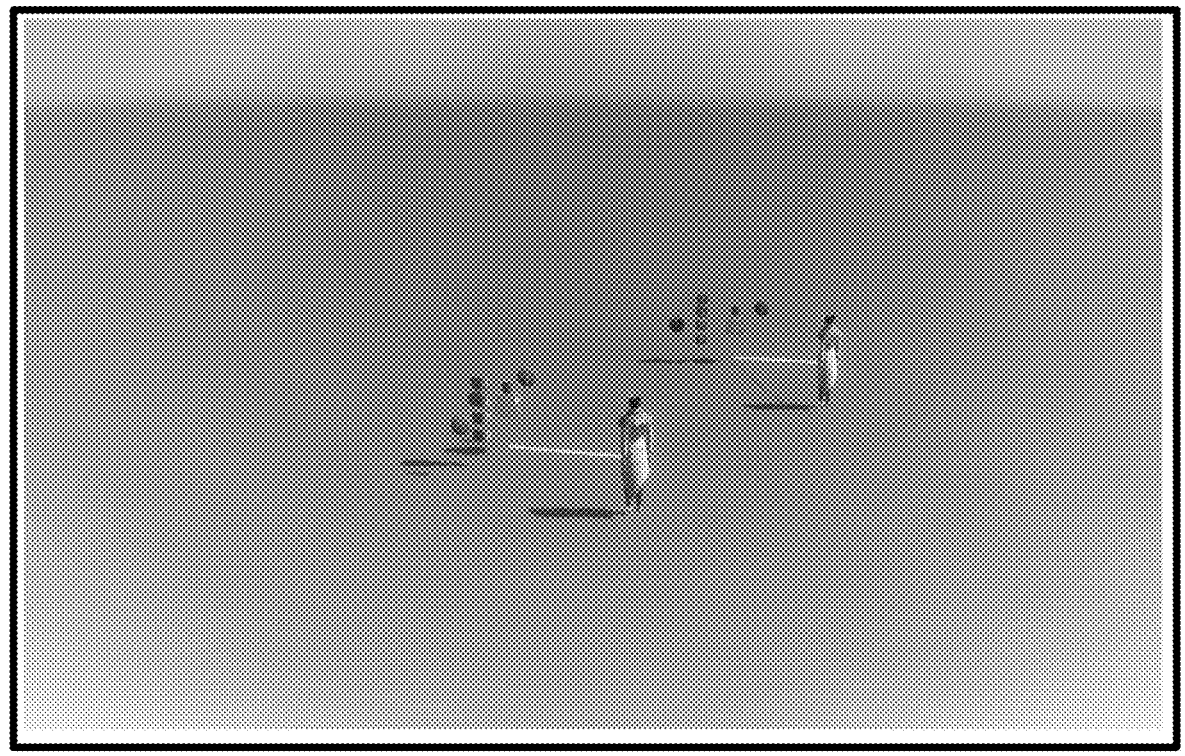
Figure 13:
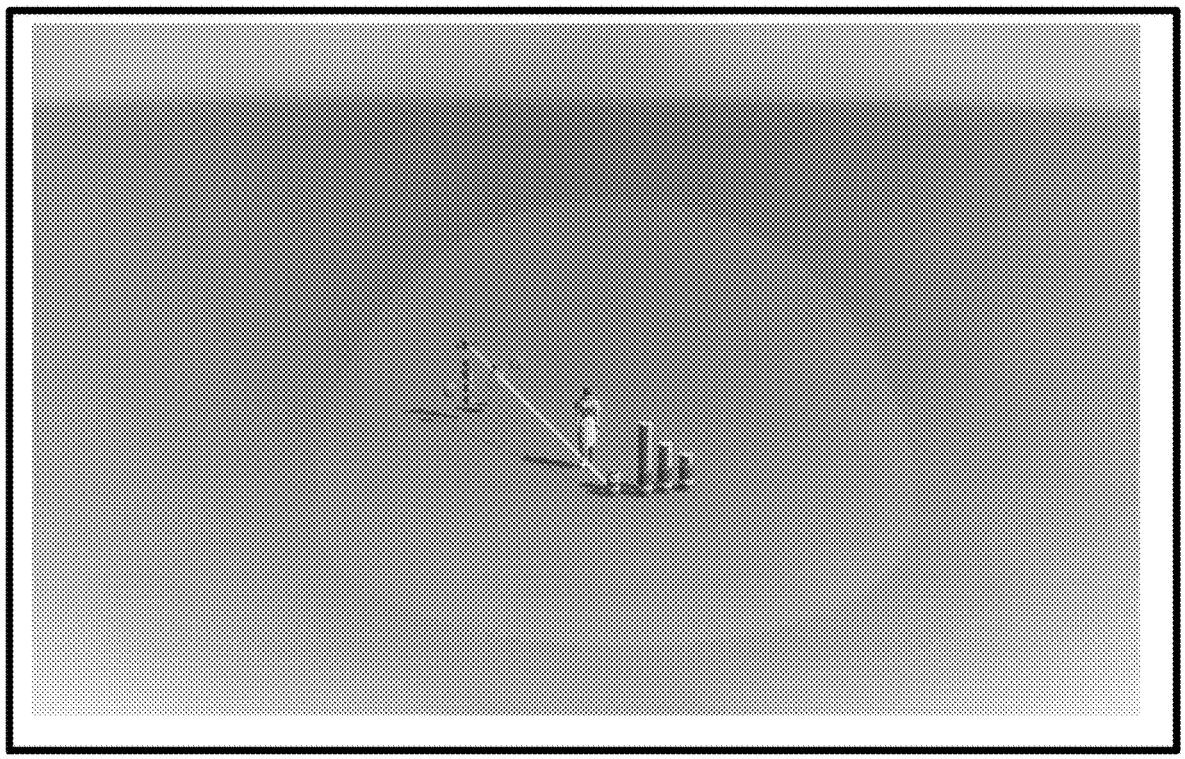
Figure 14:
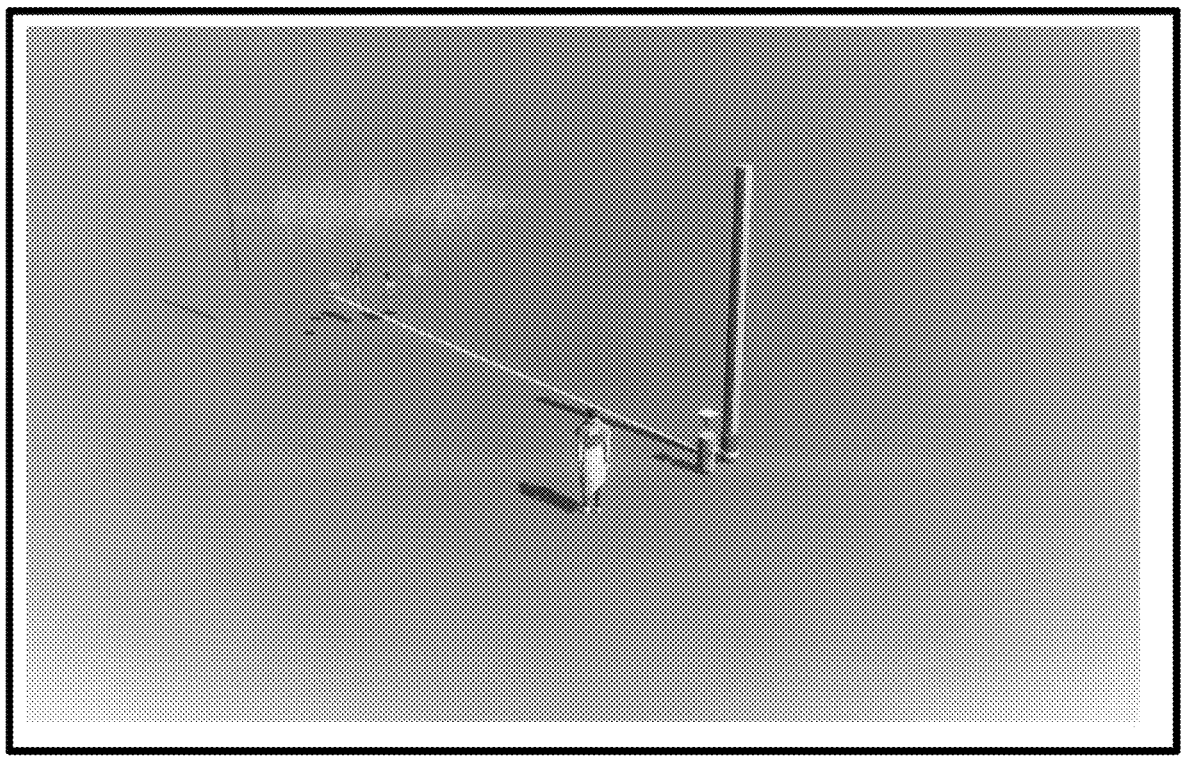

FIGS. 11-17 illustrate sample screen shots of the dynamic content generation in the virtual world. For example, FIG. 11 shows a single avatar with a single content source and multiple toggle buttons and dials. Also visible in the screenshot is the proximity of the avatar to the object. FIG. 12 shows a multiple avatar environment, showing the co-existence of multiple avatars in the virtual space. FIG. 13 shows an audio DSP effect in a proximity relationship with a sound source. This particular DSP has 3 available parameters, here embodied as faders that the user can control. FIG. 14 shows a pulse to a sound source with dynamic playhead positioning along the sound source's waveform. In this instance each tempo-pulse would trigger a discrete envelope of the waveform starting at the user-defined playhead position.

Figure 15:
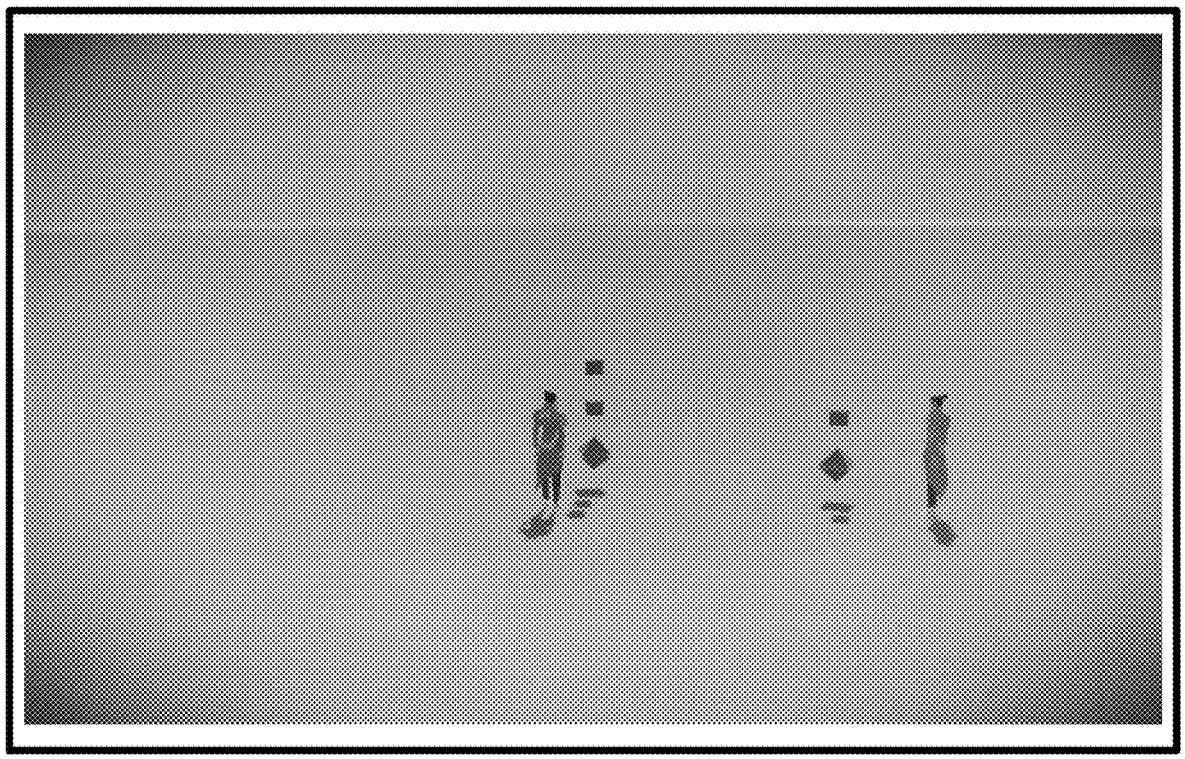
Figure 16:
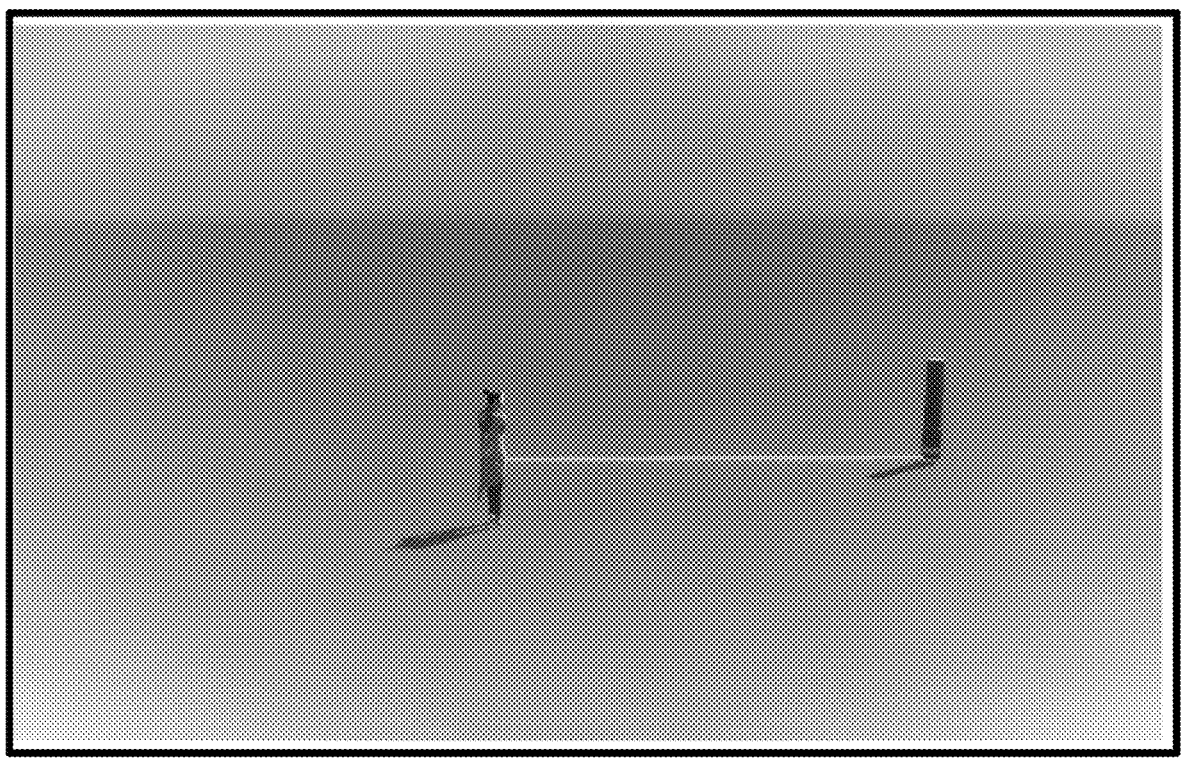
Figure 17:
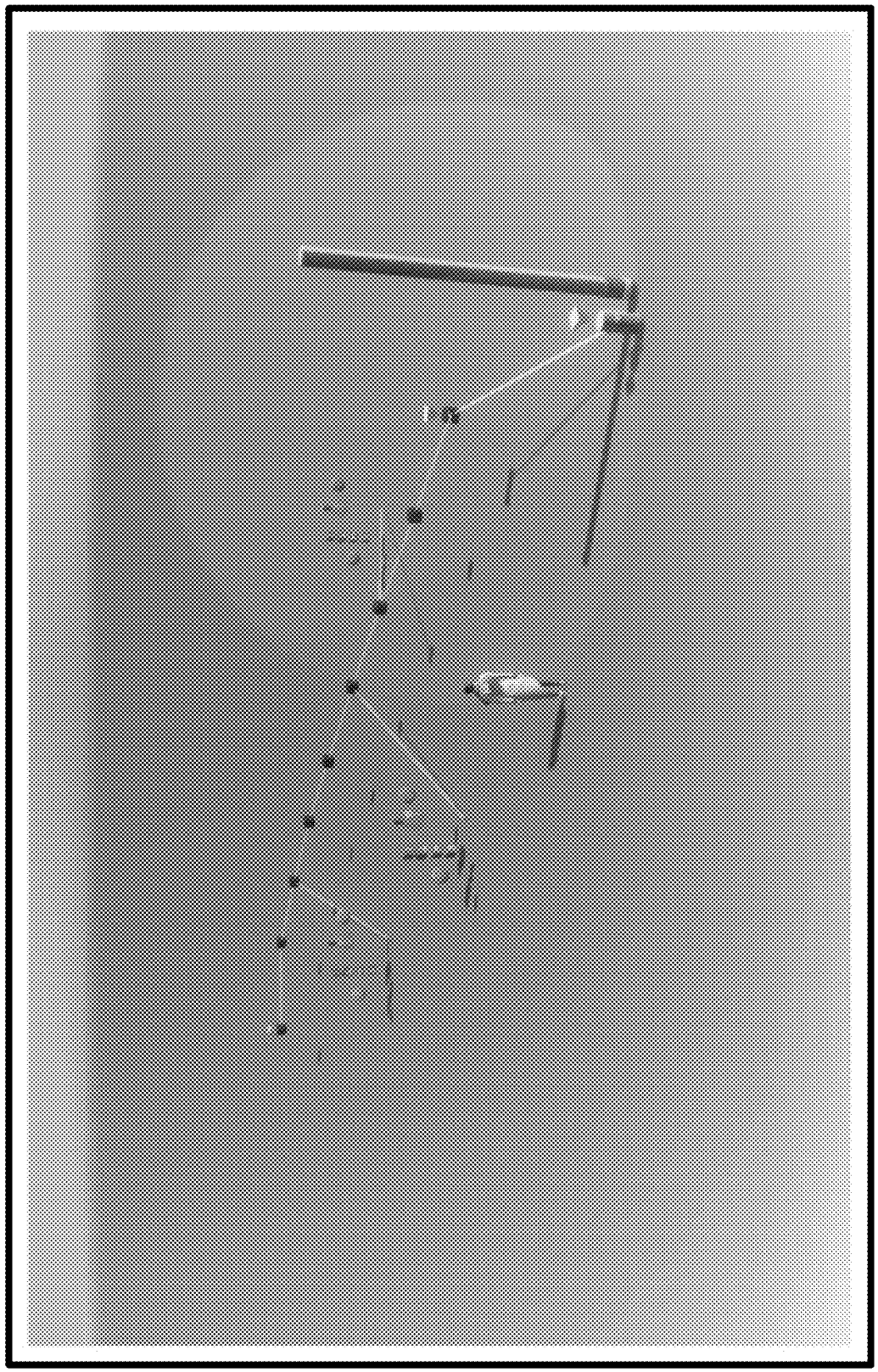

FIG. 15 illustrates a virtual space with multiple avatars and proximity relationship with multiple camera filters. FIG. 16 illustrates the avatar proximity to a fader. FIG. 17 illustrates a screenshot of a pulse node sequence as described herein.

Herein, the method and system generates dynamic content by virtual objects providing content output, the virtual objects modified by proximity of an avatar in the virtual space.

FIGS. 1 through 17 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

The invention claimed is:

1. A computerized method for dynamic content generation during gameplay in a virtual space, the method comprising:

selecting, in response to a first user input command received during the gameplay, a virtual object visual within the virtual space, the virtual object providing audio content in the virtual space, wherein the virtual object includes an audio library associated therewith and the selecting the virtual object includes selecting the audio content from the audio library;

defining, in response to a second user input command received during the gameplay, an interaction parameter for the virtual object, wherein the interaction parameter adjusts an audible component of the audio content and the interaction parameter adjustable to movement along at least one axis in the virtual space;

in response to a third user input command, instantiating an avatar in the virtual space, the avatar operative for movement along the at least one axis in the virtual space;

pairing a location of the avatar to the interaction parameter for the virtual object, the interaction parameter for the virtual object adjusting the audio content generated by the virtual object based on movement by the avatar;

receiving user input commands during the gameplay for changing a distance between the virtual object and the avatar within the virtual space;

based on the interaction parameter, dynamically creating a modified audio content generated by the virtual object based on the changes in distance between the virtual object and the avatar; and providing the modified audio content to an output device external to the virtual space.

2. The method of claim 1, wherein the interaction parameter includes adjusting the audible component, the audible component including at least one of: volume, pitch, panning, sampling, synthesis parameter, and midline parameter.

3. The method of claim 1, wherein the avatar is a first avatar, the virtual space including the first avatar and a second avatar, the method further comprising:

receiving an avatar switch command;

changing user control from the first avatar to the second avatar;

modifying the audio content generated by the virtual object based on a position of the second avatar.

4. The method of claim 1, wherein the virtual object is a first virtual object, the virtual space including the first virtual object and a second virtual object, the method further comprising:

receiving a switch virtual object command;

disassociating engagement with the first virtual object and engaging the second virtual object;

updating the audio content based on the second virtual object.

5. The method of claim 4, wherein the second virtual object is a visual object generating display content, the method further comprising:

defining a second interaction parameter for the visual object; and modifying a visual output generated by the visual object based on the second interaction parameter and a change in distance between the visual object and the avatar.

6. The method of claim 5, wherein the second interaction parameter includes at least one of: color assignment, light intensity and radius, contrast, brightness, and saturation.

7. The method of claim 1 further comprising:

defining a proximity factor for the virtual object;

determining a proximity value based on the position of the avatar relative to the virtual object in the virtual space; and modifying the audio content generated by the virtual object based on the proximity factor and the proximity value.

8. The method of claim 1 further comprising:
determining a digital signal processing operation associated with the audio source, the digital signal processing operation including expressive parameters; and
modifying at least one of the expressive parameters of the digital signal processing operation based on a change in position of the avatar.

9. The method of claim 1, wherein the modifying the audio content generated by the virtual object is performed external to the virtual space.

10. The method of claim 1 further comprising:
engaging the avatar for movement of the virtual object in the virtual space; and
adjusting the modifying of the audio content generated by the virtual object based on the movement of the virtual object.

11. The method of claim 10 further comprising:
applying force calculations to the movement of the virtual object, the force calculations emulating real world force factors.

12. A computerized method for dynamic content generation in a virtual space during gameplay, the method comprising:
selecting, in response to a first user input command received during the gameplay, a first virtual object visual within the virtual space, the first virtual object providing first audio content in the virtual space, wherein the virtual object includes an audio library associated therewith and the selecting the virtual object includes selecting the audio content from the audio library;
defining, in response to a second user input command during the gameplay, an interaction parameter for the first virtual object, wherein the interaction parameter adjusts an audible component of the audio first content and the interaction parameter adjustable to movement along at least one axis in the virtual space;
selecting during the gameplay, a second virtual object, the second virtual object generating at least one of: second audio content and display content;
pairing a location of the second virtual object to the interaction parameter for the first virtual object;
receiving a third user input command during the gameplay for changing a distance between the first virtual object and the second virtual object within the virtual space;
modifying the first audio content generated by the first virtual object based on a proximity relationship between the first virtual object and the second virtual object; and
providing the modified audio content to an output device external to the virtual space.

13. The method of claim 12 further comprising:
in response to a user input command, instantiating an avatar in the virtual space, the avatar operative for movement along the at least one axis in the virtual space;
receiving user input commands for changing the position of at least one of: the first virtual object and the second virtual object, within the virtual space; and
modifying the first audio content generated by the first virtual object based on changes in position of the second virtual object.

14. The method of claim 13 further comprising:
the user input commands relate to changing the position of the avatar within the virtual space, the avatar changing the position of at least one of: the first virtual object and the second virtual object.

15. A computerized system for dynamic content generation during gameplay in a virtual space, the system comprising:
computer readable medium having executable instructions stored thereon; and
a processing device, in response to the executable instructions, operative to:
select, in response to a first user input command received during the gameplay, a virtual object visual within the virtual space, the virtual object providing audio content in the virtual space, wherein the virtual object includes an audio library associated therewith and the selecting the virtual object includes selecting the audio content from the audio library;
define, in response to a second user input command received during the gameplay, an interaction parameter for the virtual object, wherein the interaction parameter adjusts an audible component of the audio content and the interaction parameter adjustable to movement along at least one axis in the virtual space;
in response to a third user input command, instantiate an avatar in the virtual space, the avatar operative for movement along the at least one axis in the virtual space;
pair a location of the avatar to the interaction parameter for the virtual object, the interaction parameter for the virtual object adjusting the audio content provided by the virtual object based on movement by the avatar;
receive user input commands during the gameplay for changing a distance between the virtual object and the avatar within the virtual space;
based on the interaction parameter, dynamically create a modified audio content generated by the virtual object based on the changes in distance between the virtual object and the avatar and
provide the modified audio content to an output device external to the virtual space.

16. The system of claim 15, wherein and the interaction parameters include adjusting the audible component including at least one of: pitch, sampling, synthesis parameter, and midline parameter.

17. The system of claim 15, wherein the avatar is a first avatar, the virtual space including the first avatar and a second avatar, the processing device further operative to:
receive an avatar switch command;
change user control from the first avatar to the second avatar;
modify the audio content generated by the virtual object based on a position of the second avatar.

18. The system of claim 15, wherein the virtual object is a first virtual object, the virtual space including the first virtual object and a second virtual object, the processing device further operative to:
receive switch virtual object command;
disassociate engagement with the first virtual object and engaging the second virtual object; and
update the audio content based on the second virtual object.

19. The system of claim 15, the processing device further operative to:
- define a proximity factor for the virtual object;
- determine a proximity value based on the position of the avatar relative to the virtual object in the virtual space; and
- modify the audio content generated by the virtual object based on the proximity factor and the proximity value.

20. The system of claim 15 further comprising the output device external to the processing device and operative to modify the audio content based on the avatar position changes.

\* \* \* \* \*